(12) United States Patent
Gerisch

(10) Patent No.: US 7,810,875 B2
(45) Date of Patent: Oct. 12, 2010

(54) STRUCTURAL PAN-CHASSIS STABILIZATION SYSTEM

(76) Inventor: Mark Von Edward Genaddi Gerisch, 1925 Little River Path, Green Bay, WI (US) 54313

(*) Notice: Subject to any disclaimer, the term of this patent is extended or adjusted under 35 U.S.C. 154(b) by 0 days.

(21) Appl. No.: 12/286,982

(22) Filed: Oct. 3, 2008

(65) Prior Publication Data

US 2009/0091159 A1 Apr. 9, 2009

Related U.S. Application Data

(60) Provisional application No. 60/997,814, filed on Oct. 5, 2007.

(51) Int. Cl.
B60J 7/00 (2006.01)
(52) U.S. Cl. .................... 296/193.07; 296/204
(58) Field of Classification Search ............ 296/193.07, 296/193.01, 187.02, 39.1, 204, 187.04
See application file for complete search history.

(56) References Cited

U.S. PATENT DOCUMENTS

| | | | | |
|---|---|---|---|---|
| 2,391,997 | A * | 1/1946 | Noble | 52/578 |
| 3,196,533 | A * | 7/1965 | Ida et al. | 29/421.2 |
| 3,256,669 | A * | 6/1966 | Seiwert | 52/789.1 |
| 3,834,487 | A * | 9/1974 | Hale | 181/292 |
| 4,130,614 | A * | 12/1978 | Saidla | 264/46.4 |
| 4,559,274 | A | 12/1985 | Kloppe et al. | |
| 4,662,052 | A | 5/1987 | Draper | |
| 4,836,600 | A | 6/1989 | Miyazaki et al. | |
| 5,102,187 | A | 4/1992 | Harasaki | |
| 5,115,621 | A | 5/1992 | Kobayashi | |
| 5,129,700 | A * | 7/1992 | Trevisan et al. | 296/193.07 |
| 5,419,610 | A | 5/1995 | Enning et al. | |
| 5,533,781 | A * | 7/1996 | Williams | 296/204 |
| 5,829,824 | A * | 11/1998 | Yamamuro et al. | 296/204 |
| 5,845,347 | A * | 12/1998 | Young | 4/613 |
| 6,050,630 | A | 4/2000 | Hochet | |
| 6,406,078 | B1 | 6/2002 | Wycech | |
| 6,428,905 | B1 * | 8/2002 | Behr et al. | 428/594 |
| 6,695,380 | B1 | 2/2004 | Hicks | |
| 6,843,525 | B2 | 1/2005 | Preisler | |
| 6,865,811 | B2 | 3/2005 | Wycech | |
| 7,055,893 | B2 * | 6/2006 | Yamamura et al. | 296/187.08 |
| 7,096,557 | B2 | 8/2006 | Hanna et al. | |
| 7,111,900 | B2 | 9/2006 | Chernoff et al. | |
| 7,416,242 | B2 | 8/2008 | Godfrey et al. | |
| 2006/0197361 | A1 * | 9/2006 | Ito et al. | 296/193.07 |

* cited by examiner

*Primary Examiner*—Kiran B. Patel
(74) *Attorney, Agent, or Firm*—Kinney & Lange, P.A.

(57) ABSTRACT

A rigidifying stabilizer device for installation against a floor pan of an automotive vehicle of a corresponding type with the device having a mating side substantially matching at least a substantial portion of a surface of the floor pan except at locations at which any interfering structures occur with the mating side having recesses provided therein to at least partially surround any of those interfering structures present. An opposite side shell is affixed to the mating shell at locations therein immediately adjacent to one another. A rigid solid filler is positioned between said opposite side shell inner shell surface and said mating side shell inner shell surface at locations therein where they are spaced apart from one another. The resulting rigidifying stabilizer device can then have the mating side shell thereof adhered to the surface of the floor pan of an automotive vehicle of the selected type.

5 Claims, 7 Drawing Sheets

STRUCTURAL PAN-CHASSIS STABILIZATION SYSTEM

CROSS-REFERENCE TO RELATED APPLICATION

This application claims the benefit of Provision Patent Application No. 60/997,814 filed Oct. 5, 2007 for STRUCTURAL CHASSIS SYSTEM.

BACKGROUND

The present invention relates to automotive vehicle structures and, more particularly, to the vehicle floor pan and structures supported thereby.

Automotive vehicle structures are often subjected to large forces during use such as result from crossing road bumps at higher vehicle speeds, traversing road turns at higher vehicle speeds, and undergoing larger accelerations. Such forces will distort the original floor pan shape and vehicle body shape in twisting these vehicle structures.

Such structural distortions result in temporarily repositioning the various operating systems in the vehicle supported by these structures. Such system repositionings result in the systems operating differently from what the automobile designers intended as, for instance, the axes about which the suspension system components operate shifting their relative orientations temporarily making the vehicle difficult to keep where desired on the road during such events. Thus, there is a desire to stabilize the vehicle structures in the face of occurrences of such forces.

SUMMARY

The present invention provides a rigidifying stabilizer device for installation against a floor pan of an automotive vehicle of a corresponding type with the device having a mating side shell having an inner shell surface, and having an outer shell surface substantially matching at least a substantial portion of a surface of the floor pan except at locations at which any appurtenances affixed to said surface of said floor pan occur, and except at locations at which automotive vehicle operating subsystems components adjacent to said surface of said floor pan occur, said outer shell surface having recesses provided therein at said locations that are correspondingly shaped to at least partially surround any of said appurtenances or automotive vehicle operating subsystems components present. The device also has an opposite side shell having an inner shell surface, and having an outer shell surface, said mating shell and said opposite side shell being affixed to one another such that said opposite side shell inner shell surface and said mating side shell inner shell surface substantially meet one another at least at some locations therein. A rigid solid filler is positioned between said opposite side shell inner shell surface and said mating side shell inner shell surface at locations therein where they are spaced apart from one another. The resulting rigidifying stabilizer device can then have the mating side shell thereof adhered to the surface of the floor pan of an automotive vehicle of the selected type where the outer shell surface of the mating side shell substantially matches the surface of that floor pan. A corresponding method for providing the foregoing is also disclosed.

DETAILED DESCRIPTION

Figure 1A:
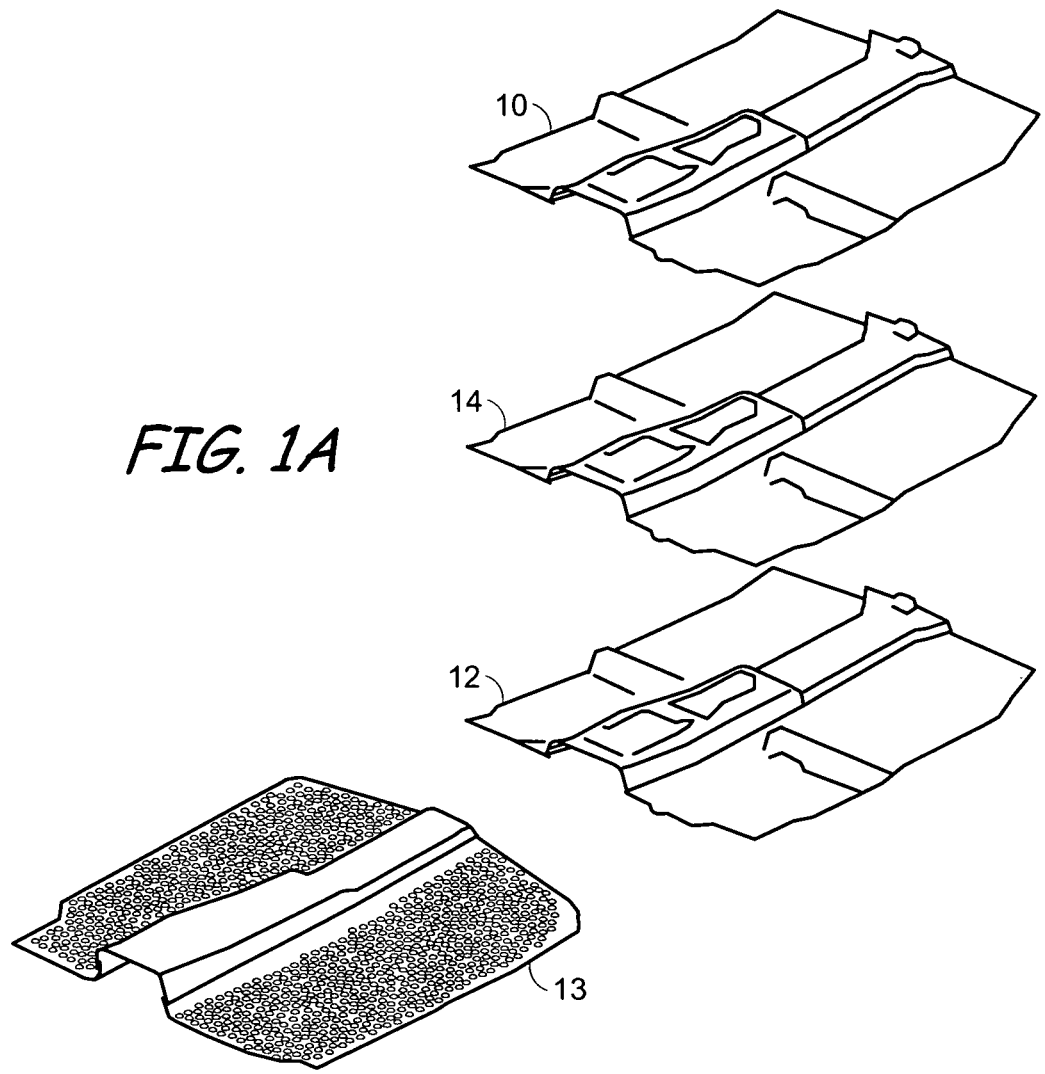
FIGS. 1A and 1B show perspective views of molds, and parts resulting from use of those molds after separation therefrom that are for inclusion in an embodiment of the present invention.

A rigidifying structure, or structures, is (are) added to a corresponding vehicle floor pan of automotive vehicles, as manufactured and assembled in, and delivered from, an automotive vehicle factory to thereby better maintain the original factory built configuration of the pan and other body components of such vehicles when they are subjected during use to relatively large forces. These stabilization results are obtained by providing such rigidifying structures so that they are shaped to conform to the surfaces of the corresponding vehicle floor pan to which they are then affixed so as to be in intimate contact therewith.

There are, of course, a wide variety of automotive vehicle types, and each of such types has a floor pan, and other body components, that are uniquely configured for that type. Thus, a rigidifying structure of a shape corresponding to the floor pan surface present in each vehicle type must be provided for the stabilization thereof, and so there will be rigidifying structures of differing surface shapes needed to have one that corresponds to the floor pan surface of each vehicle type selected to have such stabilization made available therefor. In addition, floor pans, even in vehicles of the same type, typically have various appurtenances affixed thereto but these are subject to some tolerances in location, sizes, etc. which must be taken into account in providing rigidifying structures of a common configuration for installation in any vehicle of that type in the stabilization thereof.

Thus, following the selection of a commercially available representative automotive vehicle of a type for which there is a desire to make available, to users of vehicles of that type, rigidifying structures for stabilizing their original vehicle configuration, that representative vehicle is then used as a template to provide the basis for fabricating such structures. This basis is established beginning with the providing of a plug mold incorporating the floor pan outside surface shape of the representative vehicle, and doing so requires gaining access to the underside of that vehicle accomplished by lifting same into a position providing such access.

Such lifting can be done, for example, by either using a drive-on hydraulic lift system, or by jacking up the vehicle resting it on four corner stands. These stands are positioned with two of them supporting the vehicle rear axle, or supporting the lower control arms of an independent rear suspension system, as near to the vehicle rear wheels as reasonably possible, and with the other two stands supporting the lower control A-arms supporting the front wheels all while keeping the vehicle level.

This positioning of the vehicle on stands results in the rear axle, or rear lower control arms, and the front lower control A arms supporting between them the remaining weight of the vehicle approximately as most of it would be supported (essentially, other than the weight of the wheels) in normal use in which the wheels on the rear axle, or rear lower control arms, and the wheels on the front lower control A-arms all on a support surface carrying the entire weight of the vehicle (such as having the wheels on ground, floor or road surfaces, or on the wheel support surfaces in a drive-on lift system). This similarity between supporting the weight of the vehicle on the corner stands and supporting that weight on the vehicle wheels avoids a possible twisting of the vehicle chassis, and especially a twisting of the vehicle floor pan, that, when supported otherwise on stands, would cause the vehicle to be in a geometrical configuration differing from what the configuration it is in when being supported by the wheels thereof.

A foamed plug mold is to be made as a template for subsequently making therefrom a hard material mold, this plug mold (and so the subsequently formed hard material mold) are to have a resulting mold upper surface matching the outside or underside, or lower, surface of the selected vehicle floor pan. Thus, any attachment bolts bonded or welded to that outside surface of the floor pan that are hanging down therefrom and that are not used, or are used merely hold a shield or any other unnecessary part for the operation of the vehicle, are then cut away so as to leave essentially the original floor pan surface. This removal of same also prevents these bolts from obstructing access to this lower surface of that floor pan.

The components of the systems used in operating the selected vehicle that are positioned below the floor pan of that vehicle, and to which access in the future must be maintained for purposes of vehicle maintenance, such as brake lines and fuel lines, must be also removed temporarily, and perhaps, in reassembly, also relocated. Again, this allows for more convenient forming of the plug mold on the lower surface of the floor pan of the selected vehicle. The floor pan is cleaned to remove any dirt, grease or other contaminants therefrom to thereby more fully expose the actual floor pan lower surface. This can be accomplished in various manners perhaps by use of a gritty or fibrous pad in connection with a suitable cleaning solution that also slightly abrades the exposed surface of the floor pan to provide a clean surface for a release agent to be subsequently used in the molding process to allow better adhering of that agent thereto.

The floor pan of the selected vehicle may have some structural support components that were welded or bonded at the factory to the lower surface thereof in various locations, and while these supports will be of the same size from vehicle to vehicle of this selected type, the mounting locations thereof may vary slightly from vehicle to vehicle of the selected vehicle type. Thus, sheet wax of suitable thicknesses are provided around these bonded or welded structural support components as component lateral dimension enlargers to, in effect, increase the lateral dimensions of such support components in directions parallel to the vehicle floor pan at the corresponding mounting locations. This will result the plug mold portions formed thereabout having corresponding cavities therein with greater lateral interior dimensions to thereby accommodate the varied placements thereof on the floor pans of different vehicles of the selected type.

That is, the resulting plug mold, which is to be made using the lower surface of the floor pan of the selected vehicle as the basis for defining the surface shape of a major side of that plug mold, would also fit snugly against the lower surface of the floor pans of other vehicles of this same vehicle type, including fitting over the structural support components thereof despite their positions varying slightly from vehicle to vehicle of that type. However, such increasing of the lateral dimensions in effect of the structural support components bonded or welded to the vehicle floor pan is to be held to being no more than that needed to accommodate the slightly different positions of those structural support components on the floor pans of different vehicles of the selected type. This is because the plug mold is desired to be in contact with much of the vehicle floor pan lower surface as possible.

A wax-like release agent is applied by brush it on in several coats (each coat dried and buffed) over this previously prepared outer or bottom surface of the floor pan of the selected vehicle, and over which the plug mold is to be formed. This includes the agent being also brushed over and about any of the sheet wax component lateral dimension enlargers that may have been formed for effectively broadening the lateral dimensions of any structural support components bonded or welded to that floor pan. This agent allows relatively easy manual removal of the plug mold to be subsequently formed thereover.

An epoxy gel coat of a thickness on the order of one-quarter inch is then brushed onto and over the release agent previously applied both to the bottom surface of the selected vehicle floor pan and any dimension enlargers previously formed thereon. This resulting gel coat is applied over the release agent to again be on and over the areas on which the plug mold is to be formed.

A batch of syntactic foam is mixed using a foam base powder, having a suitable matrix material and microballoon content to yield desired compression and tensile properties useful for molding. Water, or perhaps other chemicals, or both, are added in selected proportions to this mix to form a pliable but relatively stiff slurry mold material that is capable of maintaining its geometrical integrity despite hanging downward from the vehicle pan outer or lower surface. This mold material is then applied typically by hand in brick-like patches to the epoxy gel coat previously applied over the selected vehicle floor pan bottom surface and over any dimension enlargers previously formed thereon.

These applied pliable material patches are next trimmed into brick-like shapes and then hand rolled into the epoxy gel coat to have the resulting thickness thereof controlled through the thickness selected for the original applied material patch along with the amount of manual roller pressure used in forcing the syntactic foam into the epoxy gel coat. The resulting set of syntactic foam brick-like mold blocks merge together to form the plug mold, and have those surfaces thereof facing downward away from the floor pan formed to be flat. This will provide a similar flat surface to the vehicle floor structural rigidifying support to be replicated therefrom. This surface shape will decrease air turbulence occurring over this rigidifying support that results from vehicle motion. This set of mold blocks, in providing such a flat bottom surface, will also have the thicknesses thereof in various locations increased to thereby provide added structural thickness, and so added rigidity in the vehicle floor structural rigidifying support to be replicated from the plug mold. In addition, the syntactic foam is formed so as to be provided with a lateral flange of about two inches width around the periphery thereof to extend laterally outward from the downward facing surface of the main body of the plug mold.

The syntactic foam is cured by allowing it to dry out in the air or by heating it in air to accelerate such drying. Thereafter, the dried foam must have gaps and cavities cut therein so as to allow reassembling, to the selected vehicle, the earlier removed components of the systems used in operating the selected vehicle and that are positioned below the floor pan of that vehicle. This reassembly thereby returns that vehicle to its factory supplied condition. In some instances, some of these operating components must be, or partially be, relocated in this reassembly to accommodate provision of the vehicle floor structural rigidifying support in vehicles of the selected type, and corresponding cavities in the syntactic foam must be provided in accordance therewith in the forming of the plug mold as described above. The cavities being made must be large enough to provide sufficient clearances in view of tolerances to thereby prevent any interferences between the plug mold and those operating components.

In addition, the plug mold, where formed along the channel in the floor pan for accommodating the vehicle drive shaft, must have, at the edges thereof along the length of that channel, relief notches cut on either side of the channel to each accommodate a girdle mounting plate. A channel girdle structure is to be mounted on those plates extending along that channel as part of the installation of the resulting vehicle floor structural rigidifying support.

After the syntactic foam has cured and the component clearance cavities and gaps have been cut into the previously flat bottom thereof, the resulting plug mold is manually removed from the outer or bottom surface of the floor pan of the selected vehicle. In some instances of selected vehicles this removal can be done without again removing the components of the systems that are used in operating the selected vehicle that are positioned below the floor pan of that vehicle. In other instances, however, those components must be again removed to make manual removal of the plug mold possible or reasonably convenient.

The removed plug mold is then sanded flat on its bottom with any unwanted dips therein filled with additional syntactic foam. This added foam is allowed again to cure and then sanded to thereby achieve as much surface flatness across the plug mold bottom as is feasible. Because a flat surface heats more from passing air and has greater drag, the bottom surface of the plug mold is then inwardly dimpled to reduce same by correspondingly causing a similar dimpled flat surface at the bottom of the vehicle floor structural rigidifying support to be replicated therefrom. This dimpling can be accomplished by providing a metal or plastic dimpled plate on the plug mold flat bottom surface which is then force into the foam and bonded thereto, or a protruding dimples roller can be forcibly rolled over the flat bottom surface to force inward dimples into that surface.

The plug mold flat bottom surface flange portion is bonded to the flat surface of a base support around one-quarter inch thick around an opening through that base support that is larger than the main body portion of the plug mold but smaller that the outer edge of the flange portion of the plug mold so that the dimpled downward facing surface of the main body portion of the plug mold is fully accessible through this base support opening. The base support is sufficiently large so as to have its outer edges being always more than six to eight inches away from the outer edges of the flange portion of the plug mold and separated more than that from the edges of the base support opening. This arrangement leaves a base support flat peripheral surface strip extending past the outer edges of the flange portion of the plug mold to the outer edges of the base support. The plug mold is then first buffed with a wool buffing pad to smooth its surfaces, and thereafter the exposed surfaces thereof are sealed by brushing on a sealer. The side of the sealed plug mold and its surrounding exposed flat base support surface over which the first hard composite mold is to be formed are thereafter both waxed through brushing on suitable release agents. These agents allow the hard mold, which is to subsequently be formed over the waxed plug mold, to be removed from that plug mold and the flat base support surface after the formation of the hard mold is complete without damage to either of these molds. This removal without damage allows additional hard molds to be made from the same plug mold as desired.

An epoxy gel coat is next brushed or sprayed onto the release agents on the first plug mold side over which the hard mold will be made. The hard mold, typically made from either commercially available structural glass fibers or from carbon fiber material and an epoxy resin, will in the following example be described as being made from carbon fiber mat or strip materials. Thus, a carbon fiber mat or strips are coated with an epoxy resin and placed over the epoxy gel coat on the first plug mold side, and the surrounding exposed flat base support surface, so as to cover them with a first carbon fiber material layer. Then, repeating, a carbon fiber mat or strips are coated with an epoxy resin and placed as a second carbon fiber layer over the first carbon fiber material layer to cover it, this process being repeated over each preceding carbon fiber material layer in an initial mold preparation stage, typically a half a dozen times. This composite of carbon material layers, interspersed with epoxy resin, is then cured by drying in open air or, to shorten the cure time, drying it in a heated oven.

Repeated additions of such carbon fiber composites in subsequent mold preparation stages followed by curing are continued until a carbon composite mold of a desired thickness is completed, typically with a thickness of between one-quarter and one-half inch. The resulting carbon composite mold, or a hard composite mold, 10, shown in the perspective view of FIG. 1A, is then manually removed from the plug mold and the exposed flat base support surface, and its edges are thereafter trimmed to leave a first hard composite mold with a flat laterally extending peripheral flange portion surrounding that portion of the hard mold formed directly over the main body portion of the plug mold (flange omitted in FIG. 1A).

Figure 1B:
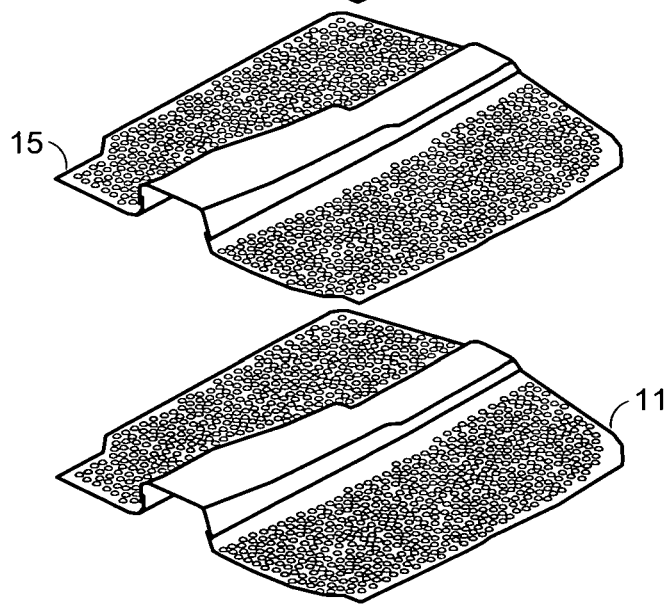

The base support with the plug mold still affixed thereto is next turned over and the foregoing process for forming a hard composite mold is repeated for the opposite side of the plug mold through the opening in the base support to provide a corresponding second hard composite mold, 11, shown in the perspective view of FIG. 1B (flange omitted in FIG. 1B). This second hard mold again has a flat laterally extending peripheral flange portion six to eight inches wide surrounding that portion of the hard mold formed directly over the main body portion of the plug mold. The first and second composite hard molds are then brought together with the flange of one in contact with the flange of the other in the proper alignment arrangement for subsequently forming the vehicle floor structural rigidifying support to be replicated therefrom, and dowel pin holes are then drilled commonly through the flanges of each. This allows inserting dowel pins in the future to repeat the alignment of these molds without additional alignment efforts.

Each of the first and second hard composite molds must have a corresponding reduced dimension version thereof provided to serve as the opposite side therefrom in a two part mold. One of these two part molds is for forming the pan configured side of the vehicle floor structural rigidifying support and the other two part mold is for forming the airflow flattened side thereof. The first and second hard composite molds are cleaned and buffed, then sealed on the sides thereof that were against the plug mold, and these sides are then covered with sheet wax to a thickness equal to that desired for the pan configured and airflow flattened sides of the vehicle floor structural rigidifying support, typically one-eighth of an inch or the thickness of about six layers of dry carbon cloth.

The reduced dimension hard composite molds corresponding to the first and second hard composite molds are then formed by brushing on a release agent over the sheet wax followed by an epoxy gel coat that is next brushed onto the release agent, and then a carbon fiber mat or strips are coated with an epoxy resin and placed over the epoxy gel coat so as to cover it with a first carbon fiber material layer. Again, repeating, a carbon fiber mat or strips are coated with an epoxy resin and placed as a second carbon fiber layer over the first carbon fiber material layer to cover it with this process being repeated over each preceding carbon fiber material layer, typically up to twenty times. This composite of carbon material layers interspersed with epoxy resin is then cured by drying in open air or, to shorten the cure time, by drying in air in a heated oven. The resulting reduced carbon composite molds, or the reduced dimension hard composite molds, have holes drilled in the flange thereof concentric with the dowel holes in the underlying hard composite mold.

Thereafter, the reduced dimension hard composite molds are manually removed from the corresponding one of the first and second hard composite molds, and the edges thereof are trimmed to leave first and second reduced hard composite molds, 12 and 13, shown in the perspective views in FIGS. 1A and 1B, respectively, each with a flat laterally extending peripheral flange portion surrounding the central portion thereof (flanges omitted in FIGS. 1A and 1B). The first and second hard composite molds have the sheet wax removed therefrom and are cleaned. Each is be used with its corresponding reduced dimension hard composite mold to form the two sides of the desired two part mold for forming the corresponding side of the vehicle floor structural rigidifying support.

Alternatively, the second side of such two part molds can be formed by vacuum bags. These bags may be preformed by using a silicone bagging spray that is sprayed on the release agent on the sheet wax covering the first and second hard composite molds to a thickness typically of one-eighth inch, and then cured by drying in open air. The resulting bags are then manually removed from the sheet wax covering the first and second hard composite molds, and again, the first and second hard composite molds have the sheet wax removed therefrom and are cleaned.

Access port openings are provided in each of first and second reduced hard composite molds 12 and 13, there being at least one such port near each of the opposite ends along the mold length. In addition, a pair of more or less parallel rubber gaskets is attached to the side of the flange of each of first and second reduced hard composite molds 12 and 13 which was across from the flange of the hard composite mold from which the reduced hard composite mold was made. After applying a release agent to the facing surfaces, six layers of dry carbon cloth are placed to cover that surface portion within the surrounding flange of a first chosen one of first and second hard composite molds 10 and 11 (which surface portion thereof was across from the reduced dimension hard composite mold during its fabrication), for example, 10. Corresponding first reduced dimension hard composite mold 12 is aligned with prepared hard composite mold 10, using dowel pins through the concentric dowel pin openings in each. They are then clamped together at the flanges thereof to complete a two part mold with dry carbon cloth present within the mold interior cavity between the hard and reduced dimension hard composites molds, the cavity provided by the presence of the now removed sheet wax.

Vacuum infusion is then used to infuse with epoxy the six layers of dry carbon cloth now in the interior cavity of the two part mold. A valve controlled source of liquid epoxy is connected to the port or ports at one end of the reduced dimension hard composite mold in the two part mold, and a vacuum pump system is attached to the port or ports at the opposite end thereof. The supplying of a vacuum to the two part mold interior cavity first draws the air out of the interior of the two part mold and then, with the epoxy source valve opened to admit a relatively small amount of epoxy to the mold interior cavity, draws that epoxy at an even rate through the interior mold cavity and through the dry carbon cloth therein to saturate same with the supplied epoxy. After the result is cured by drying in air, or in an oven to reduce drying time, hard composite mold 10 and reduced hard composite mold 12, together forming the two part mold, are separated to leave corresponding floor pan mating support side, or pan side shell, 14, of the desired vehicle floor structural rigidifying support molded in this two part mold thus removed as shown in perspective in FIG. 1A. This process is repeated with the remaining second reduced dimension hard composite mold 13, and its corresponding hard composite mold 11, to form another two part mold that is then used to provide the other support side, or road, support side, or road side shell, 15, of the vehicle floor structural rigidifying support as shown in perspective in FIG. 1B.

Alternatively, the vacuum bags formed as described above can be used with the hard composite molds instead of the first and second reduced dimension hard composite molds to form corresponding two part molds. Each of the vacuum bags formed has a sealing ring adhesively attached to the edge thereof, and again port openings are provided near the opposite ends of the bag along its length. Six layers of dry carbon cloth are placed to cover that surface portion within the surrounding flange of a first chosen one of the first and second hard composite molds which surface portion thereof was across from the vacuum bag during its fabrication. The sealing ring of the vacuum bag is sealed to the flange of the hard composite mold holding the dry carbon cloth. Vacuum infusion is again used again to infuse with epoxy the six layers of dry carbon cloth, as above, to provide the corresponding side of the vehicle floor structural rigidifying support. This process is repeated with the remaining one of the first and second reduced hard composite molds and its corresponding vacuum bag to provide the other side of the vehicle floor structural rigidifying support.

Although the foregoing description of providing the two sides for a vehicle floor structural rigidifying support indicates a sequence of construction steps yielding the two sides for a single, or one piece, vehicle floor structural rigidifying support for subsequent installation against essentially the entire vehicle floor pan, this is but one alternative for such a support. Another alternative is providing two such vehicle floor structural rigidifying supports, as a two piece support, with each being a support piece that is just a bit less than half the one piece support considered divided along lines paralleling the drive shaft channel in the vehicle floor pan. That is, such a two piece vehicle floor structural rigidifying support arrangement for subsequent installation of each against essentially a corresponding half (or somewhat less if all of the drive shaft channel is not covered) of the entire vehicle floor pan thus has each piece constructed individually. Hence, a corresponding side conforming to half (or a bit less) of a floor pan, and a further opposite dimpled flat side, are provided for each of the two support pieces.

Figure 2:
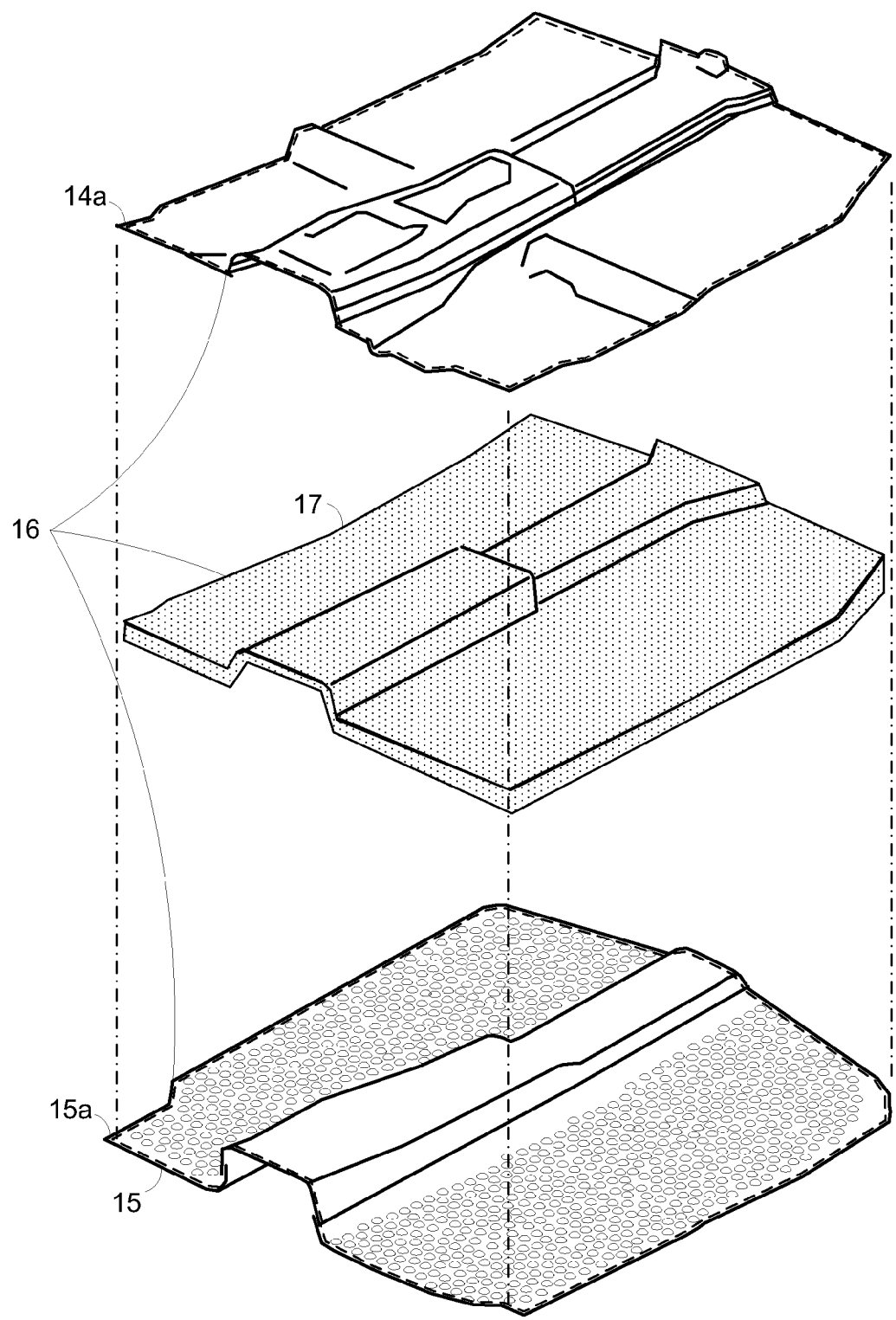
FIG. 2 shows an exploded perspective view of an embodiment of the present invention including the molds of FIG. 1.

Completed opposite sides, or shells, 14 and 15 for the desired vehicle floor structural rigidifying support have the flanges thereof each trimmed to leave one-half to one inch thereof so as to form a reduced flange 14*a* and 15*a* on each as indicated in FIG. 2 by a near periphery dashed line, but one that is also trimmed to match that of the other. This trimming leaves the dowel holes in the resulting reduced flanges intact. The surfaces of the reduced flanges of these two support sides that will be mated to one another, as the basis for forming the vehicle floor structural rigidifying support, are first subjected to enough grinding to clean each of them after which a commercially available epoxy adhesive is provided on each cleaned flange mating surface. The reduced flanges of these two hard composite molds are then mated and dowel pins are provided in the corresponding holes therein to align the molds with one another, a position in which the reduced flanges are then kept in through their being clamped together. The epoxy adhesive between the reduced flanges is then allowed to air cure at room temperature, although heating can be used to reduce the cure time.

Thereafter, suitable fill and expansion holes are drilled through one or both of adhered support sides, or shells, 14 and 15, and an expandable marine grade foam is introduced through the fill holes into the space between these two support sides. Following a four hour curing time in air, the excess foam outside of the fill and expansion holes is trimmed away. In addition, holes may be drilled into the foam through the fill and expansion holes and a plastic plug inserted in each. Any excess adhesive present at the edges of the reduced flanges where mated to one another is also trimmed away to finish forming a one piece vehicle floor structural rigidifying support, 16, shown in the exploded perspective view of FIG. 2 with a solid foam filler, 17, between support sides 14 and 15.

Figure 3:
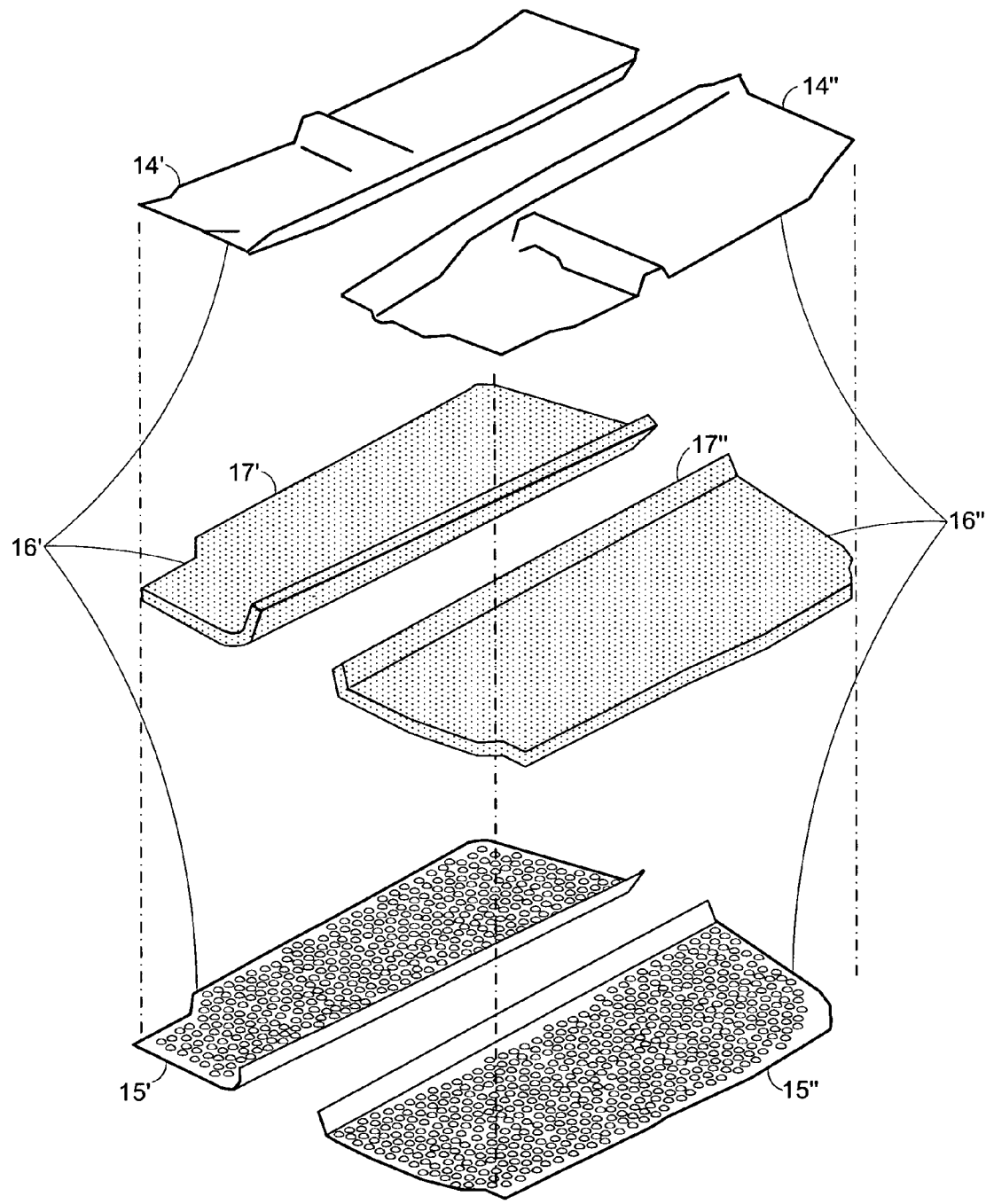
FIG. 3 shows an exploded perspective view of another embodiment of the present invention.

Similarly, in the instance of a two piece vehicle floor structural rigidifying support, a first pair of support sides, or shells, 14' and 15', of a first piece vehicle floor structural rigidifying support, 16', are joined in the same manner, and the space between them is similarly filled with foam that is similarly thereafter trimmed to provide a foam filler, 17'. Again, there can be selective plugging of the fill and expansion holes in the support sides to complete same. This is repeated with a second first pair of support sides, or shells, 14" and 15", for a second piece vehicle floor structural rigidifying support, 16", that are joined in the same manner, and the space between them is similarly filled with foam that is similarly thereafter trimmed to provide a foam filler, 17". Once more, there can be selective plugging of the fill and expansion holes in the support sides to complete same. The two piece vehicle floor structural rigidifying support with support pieces 16' and 16" is shown in the exploded perspective view of FIG. 3.

A flat, more or less rectangular solid shaped girdle plate is also fabricated that will be bolted across the drive shaft channel to the girdle mounting plates on either side of the channel following installation in a vehicle of either a one piece vehicle floor structural rigidifying support or a two piece support. This girdle plate can be machined from all metal, such as aluminum or magnesium, with holes provided therein matching the threaded holes in the girdle mounting plates. Alternatively, the girdle plate can be formed as a composite structure in the same manner as the composite structure of the vehicle floor structural rigidifying support, or of the support pieces in the two piece arrangement, again with holes provided therein matching the threaded holes in the girdle mounting plates. These holes, however, will have truncated cylindrical shell shaped liners therein so that the tightening of the bolts affixing the girdle plate to the girdle mounting plates at installation on a vehicle does not crush the composite structure material.

Also, a pair of aluminum girdle mounting plates, 16*a* and 16*b*, in the form of extended rectangular solids have a series of threaded holes provided therein along the length thereof three to six inches apart, are prepared using typical aluminum machining methods. These are each bonded, using a commercially available epoxy bonding adhesive, in the corresponding one of the notches provided therefor in the flat dimpled side of the vehicle floor structural rigidifying support located near, and on either side of, the portion thereof that is formed to fit into the drive shaft channel in the vehicle floor pan (or in the corresponding notch provided therefor in the flat dimpled side of each vehicle floor structural rigidifying support piece in a two piece arrangement in which again each notch is located in the corresponding support piece near the portion thereof that is formed to fit into the drive shaft channel in the vehicle floor pan). These girdle mounting plates are shown in the exploded perspective views of FIGS. 4A and 4B.

Resulting vehicle floor structural rigidifying support 16 (or resulting two piece support 16' and 16"), and the resulting girdle plate, so formed, are each very rigid structures insofar as substantially resisting any attempts to bend them. In a modification that does substantially change this rigidity characteristic, resulting vehicle floor structural rigidifying support 16 (or resulting two piece support 16' and 16") will often, though not always, have relatively small holes drilled through it, including through both hard composite mold portions thereof, for use in riveting same to the floor pan on which it is finally installed. Such rivet holes are typically provided in locations at which portions of the two hard composite molds in the vehicle floor structural rigidifying support are close to one another, and at which such portions will be across from a box-like structure in the floor plan on which it is finally installed. These rivet holes are across from the rivets, 18, shown in FIGS. 4A and 4B on the opposite sides of the rigidifying supports, 16 in FIGS. 4A and 16' and 16" in FIG. 4B, from a floor pan, 19, provided in the selected vehicle (not shown in these figures).

Resulting one piece vehicle floor structural rigidifying support 16, or two piece vehicle floor structural rigidifying support 16' and 16", can be shipped to buyers for installation by the buyer in a vehicle chosen for rigidification of the selected type, or by a vehicle body or repair shop acting for the buyer. This installation requires lifting the vehicle of the selected type into a position to provide access to the underside thereof as described above for the fabrication of plug molds. Here, too, components of the systems used in operating the selected vehicle that are positioned below the floor pan of that vehicle, such the exhaust system and fuel and brake lines, that would otherwise interfere with the installation, and any superfluous attachment bolts, must be removed. The floor pan is cleaned to remove any dirt, grease or other contaminants therefrom to thereby more fully expose the actual floor pan lower surface to allow better adhering of an adhesive thereto. Such cleaning can be accomplished by using a degreasing agent or acetone.

Either a one piece 16, or two piece 16' and 16", vehicle floor structural rigidifying support is then moved into position, as the basis for attempting to further position it against the selected vehicle floor pan, using a suitable jack or jacks, to determine whether there are any fitting interferences encountered in the attempt at positioning against the vehicle floor pan and any of the remaining attachments to that pan. If any such fit interferences are found, usually some minor scraping or sanding of the support, or some minor grinding of the floor pan attachments, at the interference locations will eliminate those interferences. When finally the one piece or two piece vehicle floor structural rigidifying support is positioned against the selected vehicle floor pan, hole locations for rivet holes to be provided in the floor pan are marked using the holes for rivets already provided in the one piece or two piece vehicle floor structural rigidifying support. The positioned support is than moved away and holes are drilled through the floor pan at the marked locations thereon.

An even layer of commercially available epoxy bonding adhesive is spread over the outside surface of the selected vehicle floor pan in those areas thereof that are to come in contact with the outer conforming surface of the one piece or two piece vehicle floor structural rigidifying support selected to be installed, and over the corresponding areas of that outer conforming surface of the one piece or two piece vehicle floor structural rigidifying support. The bonding adhesive is supplied from a tubular container that is inserted into a conventional manually or powered operated caulking dispenser, and then further spread over the surfaces with a serrated plastic applicator to spread the adhesive thereon in accord with the manufacturer's recommended areal density of that adhesive.

The greater the fraction of the vehicle floor pan to which one piece vehicle floor structural rigidifying support 16, or two piece vehicle floor structural rigidifying support 16' and 16", is bonded, the greater the resistance of that floor pan to bending under large forces being applied thereto. Typically, at least twenty to thirty percent of the area of the floor pan nearest the outer sides of the vehicle needs to be bonded to a vehicle floor structural rigidifying support, but better rigidification will be obtained if fifty percent or more of the vehicle floor pan is bonded to such a support.

Figure 4A:
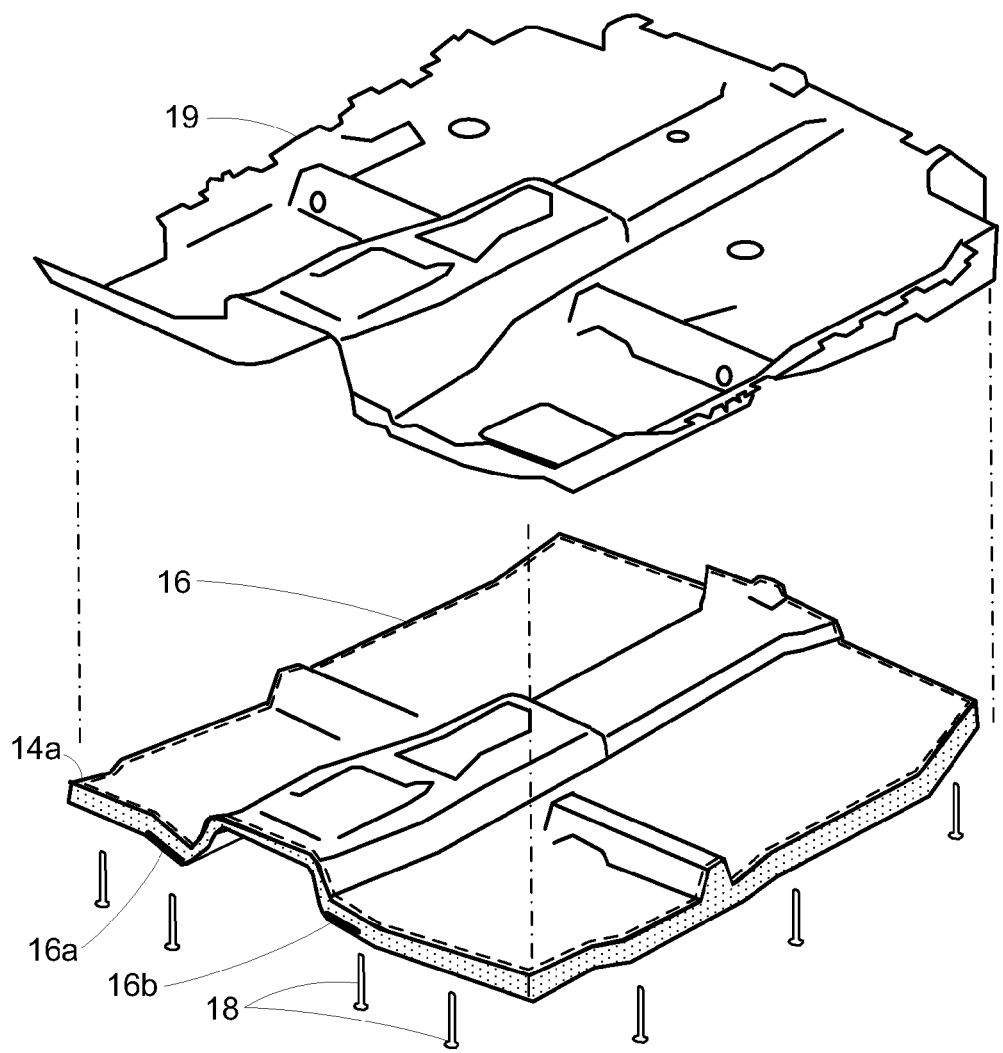
FIG. 4A shows an exploded perspective view of the embodiment of the present invention shown in FIG. 2 as initially prepared for vehicle installation.
Figure 4B:
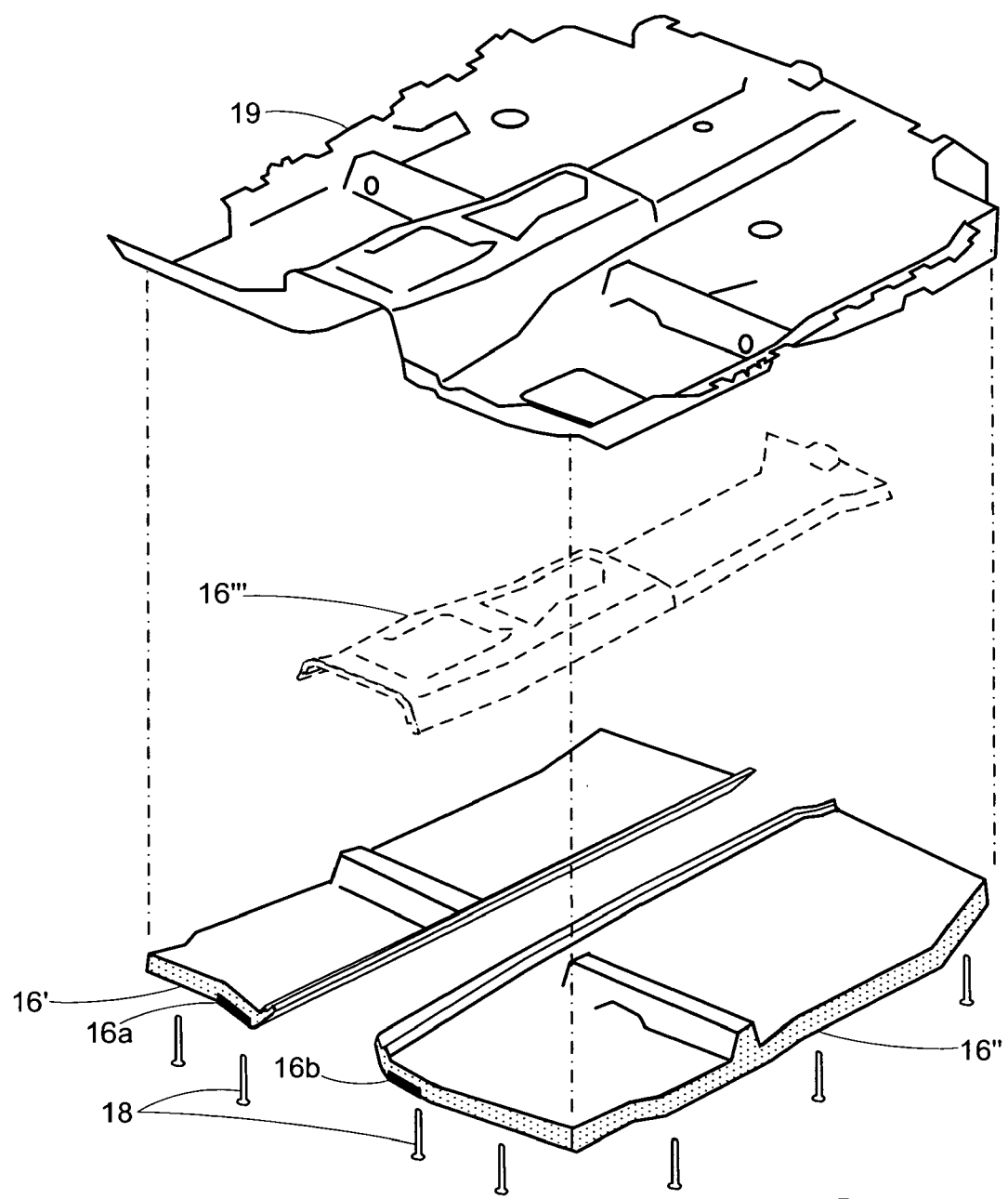
FIG. 4B shows an exploded perspective view of the embodiment of the present invention shown at least in part in FIG. 3 as initially prepared for vehicle installation.

Either that one piece vehicle floor structural rigidifying support 16, or two piece vehicle floor structural rigidifying support 16' and 16", so prepared, is then again moved into position against the selected vehicle floor pan, so prepared, again using a suitable jack or jacks, as the basis for adhesively bonding that support to that floor pan. Rivets 18 are then inserted through the rivet holes in that support and the corresponding rivet holes in that floor pan 19 as indicated in FIG. 4A for one piece vehicle floor structural rigidifying support 16, and as indicated in FIG. 4B for two piece vehicle floor structural rigidifying support 16' and 16". The positioned one piece or two piece support with rivets 18 inserted therein is thereafter riveted to pan 19. A six hour air curing time is then provided for the adhesive to cure in this bonding operation.

Further shown in dashed line form in FIG. 4B is an optional drive shaft channel structural rigidifying support, 16''', that can be adhered to the upper portion of the outside surface of the drive shaft channel in floor pan 19 between the two support pieces of two piece vehicle floor structural rigidifying support 16' and 16". Though not usually required to obtain satisfactory rigidification of floor pan 19, the addition of support 16''' will increase the rigidity of that floor pan.

Figure 5:
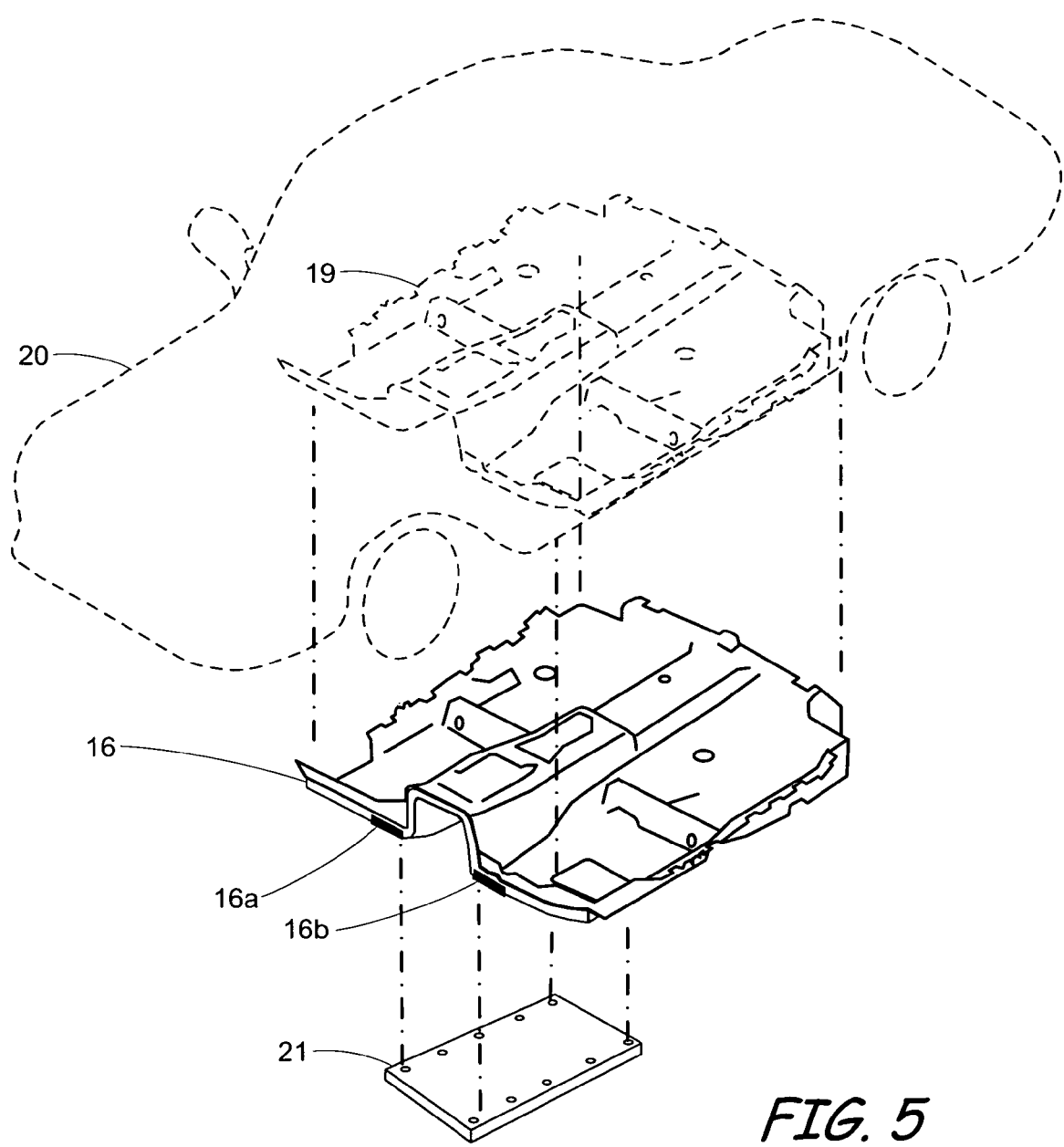
FIG. 5 shows an exploded perspective view of the embodiment of the present invention shown in FIGS. 2 and 4A as would result from a completed vehicle selective installation thereof.

Upon completion of the curing of the adhesive bonding together of either one piece vehicle floor structural rigidifying support 16, or two piece vehicle floor structural rigidifying support 16' and 16", and floor pan 19 of a selected vehicle, 20, the installation of a girdle plate, 21, follows as indicated in the exploded perspective view of FIG. 5 having the car and the pan in phantom. This plate is bolted on each side thereof to the corresponding one girdle mounting plates 16a and 16b previously bonded to the notches in the dimpled, otherwise substantially flat, surface of the support side still accessible on the outside of that support. The presence of the girdle plate substantially limits the bending of the floor pan portion of one side of the drive shaft channel in the vehicle floor pan with respect to the floor pan portion on the other side of that channel that is otherwise favored to occur along that channel in the absence of any other significant structures being present to maintain the original spacing of the channel sides set at the factory. The mounting of this plate completes the installation of the one piece or two piece vehicle floor structural rigidifying support in the vehicle chosen for rigidification of the selected type.

Figure 6A:
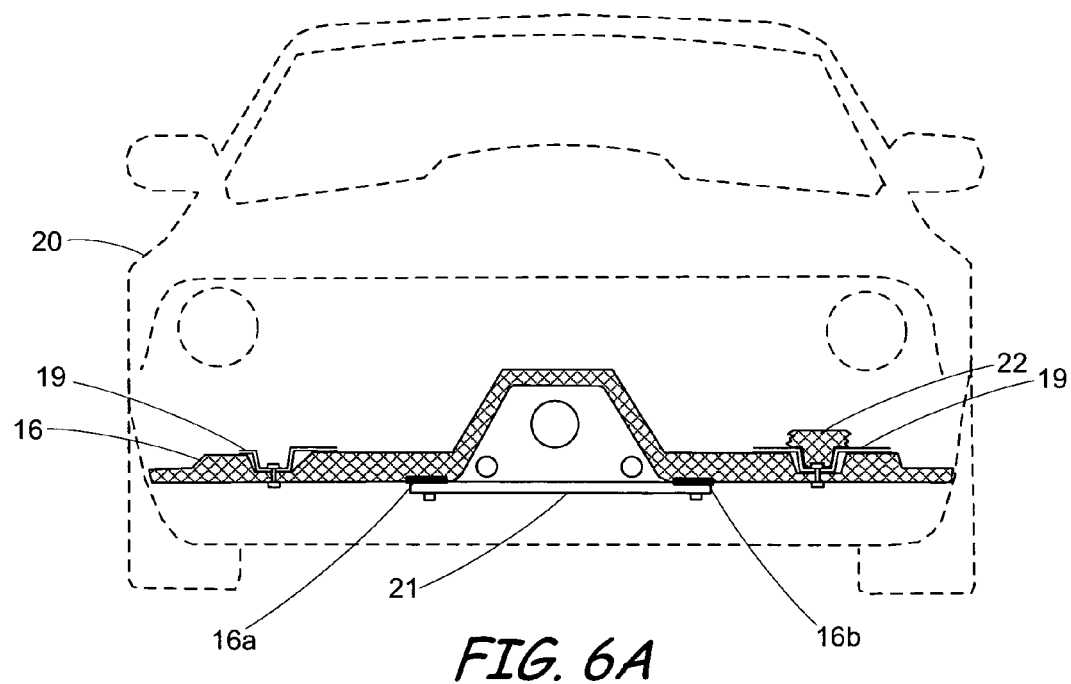
FIG. 6A shows a front elevation view of the embodiment of the present invention shown in FIGS. 2, 4A and 5 as would result from a completed vehicle selective installation thereof.
Figure 6B:
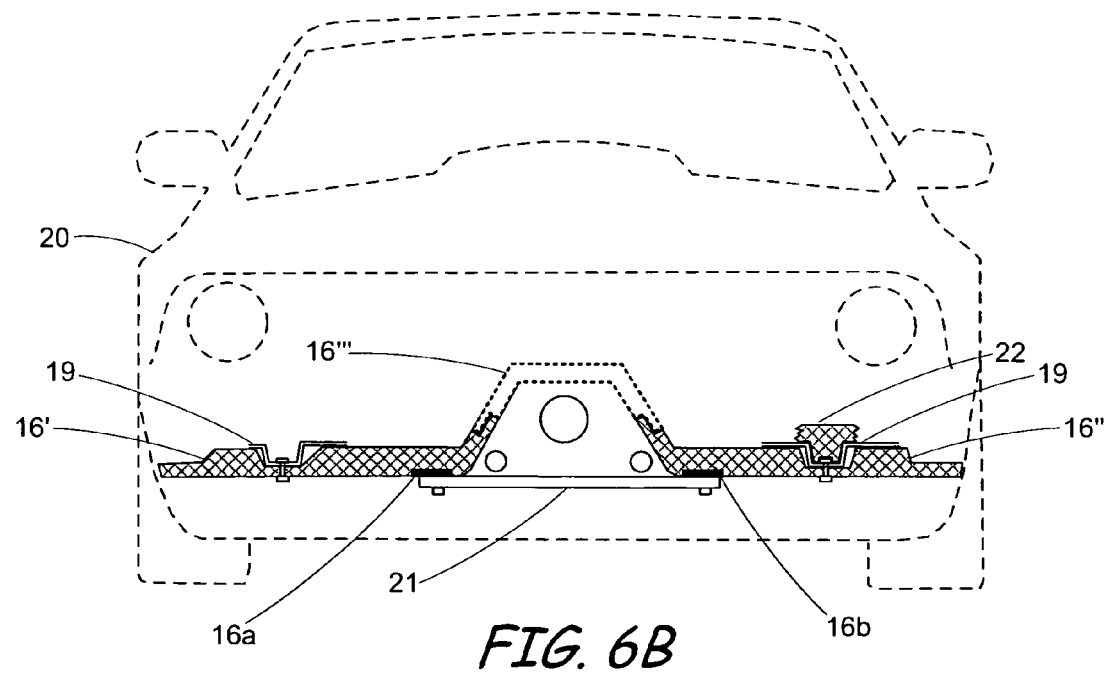
FIG. 6B shows a front elevation view of the embodiment of the present invention shown in FIGS. 3 and 4B as would result from a completed vehicle selective installation thereof.

One piece vehicle floor structural rigidifying support 16, after the completed installation thereof in car 20, is shown in the front elevation view of FIG. 6A with this car being shown in phantom along with only a portion of floor pan 19. Similarly, two piece vehicle floor structural rigidifying support 16' and 16", after the completed installation thereof in car 20, is shown in the front elevation view of FIG. 6B with this car being shown in phantom along with only a portion of floor pan 19. Also indicated in FIG. 6B, although optional, is drive shaft channel structural rigidifying support 16'''.

In a further alternative, the seats and floor carpet interior to a selected vehicle can be temporarily removed to allow providing vehicle floor structural rigidifying support pieces correspondingly shaped for each depression in the floor pan as seen from the interior of a selected vehicle. These supports can be made in the manner as the one piece or two piece vehicle floor structural rigidifying supports described above, and again bonded into the corresponding floor pan depressions to also add rigidity to the floor pan of a selected vehicle. A portion, 22, of such an opposite side vehicle floor structural rigidifying support is shown in each of FIGS. 6A and 6B.

The one piece or two piece vehicle floor structural rigidifying support, so installed in a vehicle chosen for rigidification of the selected type, lends its rigidity so as to also substantially rigidify the combination thereof with the floor pan to which it is bonded. This rigidification substantially reduces or eliminates having one portion of the floor pan that bends or twists, or both, with respect to other portions thereof when subjected to large forces, that is, having such forces otherwise distort of the shape of the vehicle floor pan as originally provided at the factory manufacturing the vehicle. Reducing or eliminating distortion of the vehicle floor pan will, in turn, correspondingly reduce or eliminate the concomitant distorting of the original shape of other portions of the vehicle body. Thus, reducing or eliminating the distorting of the vehicle floor pan will, for example, tend to maintain the vehicle suspension subsystem in relatively correct geometrical positions under large forces occurring in the vehicle to thereby much improve the performance of the vehicle in such circumstances.

Although the present invention has been described with reference to preferred embodiments, workers skilled in the art will recognize that changes may be made in form and detail without departing from the spirit and scope of the invention.

The invention claimed is:

1. A rigidifying stabilizer device for installation against a floor pan of an automotive vehicle, said device comprising:
    a pan side shell formed to avoid selected appurtenances affixed to said floor pan and to avoid selected automotive vehicle operating subsystems components adjacent to said floor pan, and to elsewhere conform to said floor pan,
    a road side shell affixed to said pan side shell such that said road side shell and said pan side shell meet one another at least at some locations therein and are spaced apart at least at some locations therein, and a rigid solid filler positioned between said road side shell and said pan side shell at locations therein where they are spaced apart from one another.

2. The device of claim 1 wherein said pan side shell has a peripheral edge flange and said road side shell has a peripheral edge flange with said pan side and said road side shell peripheral edge flange portions meeting one another.

3. The device of claim 2 wherein said pan side and said road side shell peripheral edge flange portions are adhered to one another.

4. The device of claim 1 wherein said pan side shell avoids selected appurtenances affixed to said floor pan and selected automotive vehicle operating subsystems components adjacent to said floor pan, and elsewhere conforms to said floor pan, so as to also be installable against a floor plan of another differing kind of automotive vehicle.

5. The device of claim 1 wherein said road side shell has an array of dimple depressions therein distributed thereacross at a side thereof facing away from said mating side shell.

* * * * *